(12) United States Patent
Chang Chien et al.

(10) Patent No.: US 9,854,141 B2
(45) Date of Patent: Dec. 26, 2017

(54) THIN OPTICAL IMAGING MODULE OF A BIOMETRIC APPARATUS

(71) Applicant: TrueLight Corporation, Hsinchu (TW)

(72) Inventors: Chia Ching Chang Chien, Kaohsiung (TW); Chih Cheng Chen, Zhongli (TW); Zhi Kuei Huang, Hsinchu (TW); Jin Shan Pan, Hsinchu (TW)

(73) Assignee: TrueLight Corporation (TW)

( * ) Notice: Subject to any disclaimer, the term of this patent is extended or adjusted under 35 U.S.C. 154(b) by 412 days.

(21) Appl. No.: 14/608,484

(22) Filed: Jan. 29, 2015

(65) Prior Publication Data

US 2016/0227081 A1  Aug. 4, 2016

(51) Int. Cl.
*H04N 5/00* (2011.01)
*H04N 5/225* (2006.01)
*G06K 9/00* (2006.01)
*G02B 5/04* (2006.01)

(52) U.S. Cl.
CPC ....... *H04N 5/2254* (2013.01); *G06K 9/00046* (2013.01); *G02B 5/045* (2013.01)

(58) Field of Classification Search
CPC ... H04N 5/2254; G06K 9/00046; G02B 5/045
USPC ............................................... 348/77
See application file for complete search history.

(56) References Cited

U.S. PATENT DOCUMENTS

| | | | |
|---|---|---|---|
| 2008/0180026 A1* | 7/2008 | Kondo | G02B 5/045 313/506 |
| 2010/0183200 A1* | 7/2010 | Wu | G06K 9/00046 382/127 |
| 2012/0001889 A1* | 1/2012 | Kimura | G09G 3/344 345/212 |
| 2012/0081635 A1* | 4/2012 | Fukuda | B29D 11/00798 349/64 |

* cited by examiner

*Primary Examiner* — Jeffery Williams (57) ABSTRACT

A thin optical imaging module of a biometric apparatus includes a first glass substrate, a first optical prism film, a second optical prism film, and an image sensor. The first glass substrate further includes a fingerprint imaging area, a vein imaging area, a contact surface, a reflective interface, and an attaching surface. The first optical prism film adhered to the attaching surface is located under the fingerprint imaging area. The second optical prism film is adhered to a position under the first optical prism film. The image sensor disposed in correspondence to the first glass substrate is located under the attaching surface.

8 Claims, 9 Drawing Sheets

THIN OPTICAL IMAGING MODULE OF A BIOMETRIC APPARATUS

BACKGROUND OF INVENTION

1. Field of the Invention

The invention relates to a thin optical imaging module of a biometric apparatus, and more particularly to the thin optical imaging module that performs scanning upon the fingerprint and the vein so as to benefit the following verification, recognition or identification work.

2. Description of the Prior Art

To enhance the security level, assure the safety, and amend possible shortcomings in personal pin numbers, digital golden keys, built-in hardware golden keys of the smart chip and the like element for digital identification technology. Nowadays, more and more identity recognition and security systems have adopted or implemented with some kinds of biometric apparatuses. Among all these biometric apparatuses, the fingerprint identification device and the vein identification device are two of popular biometric apparatuses.

On the other hand, a dual-mode biometric module, though reliable, faces a major problem in software integration. In the art, relevant detectors are included to meet different objects to be detected. For example, in a fingerprint-and-vein dual-mode biometric module, one image sensor shall be included to perform and manage the vein image, while another image sensor with an optic prism shall be also included to handle the fingerprint image (or applying a capacitor-type fingerprint detector). The major reason to include two types of sensors is because the instinct imaging technology for the vein and the finger are different. For imaging the vein, an ultra-red light to penetrate the finger can be sufficient to capture the vein image in the finger. However, to capture the fingerprint image, the optical theory of total reflection upon an optic prism shall be utilized so as sufficient to increase the degree of recognition upon the ridges and the valleys on the fingerprint.

Basically, the optical paths for capturing the vein image and the fingerprint image are different. In addition, the arrangement of the conventional fingerprint prism is highly related to the increase of the module volume. Further, though the capacitor-type fingerprint sensor can be produced in a reduced volume, yet the distant client end would meet the following situations: (1) questionable reliability of the capacitor-type fingerprint sensor while is applied to face plural devices or systems, and (2) price hike upon the whole module due to the usage of the capacitor-type fingerprint sensors.

In a Taiwan patent application with a publication number 201413596 (TA 596, hereinafter), the applicant mentioned that a prior application "Biometric apparatus and method" can resolve the aforesaid shortcomings of the conventional dual-mode biometric modules. However, in TA 596, a conventional prism was still applied to provide two different optical paths for the dual-mode biometric module. For the conventional prism performed as a light-guide module has a larger and hard-to-be-reduced thickness, and also for the conventional prism would contribute one more reflection there inside, so the image would encounter a nonlinear deformation, thus unexpected. It is one of the incentives for the applicant to devote to introducing the following thin optical imaging module of a biometric apparatus in this disclosure.

According to the image-capturing module for the fingerprint and the vein currently in the marketplace, for example the NEC HS-100 the fingerprint optical imaging module, it usually applies two image sensors simultaneously to capture respectively one fingerprint image and one vein image. Through different image sensors with specific focusing ranges to capture and identify the fingerprint and the vein, the time spent on capturing and handling the images may be reduced, but the overall cost for the module would be increased substantially.

In another example, the M2SYS fingerprint optical imaging module (FUSE-ID), in order to provide an integrated system having an optical imaging module and a fingerprint module, the whole size of the system is high to 100 mm*120 mm*74 mm. The system has two image sensors for capturing the fingerprint image and the vein image, respectively, and the time for completing the image capturing is somehow extended.

Accordingly, a thin optical imaging module of a biometric apparatus is thus provided in this disclosure, in which a glass substrate has an optical prism film (prism sheet) attached thereon and a single image sensor, so that the required optical path as well as the volume can be reduced. Through the single image sensor, the fingerprint image and the vein image can be captured simultaneously in a single action. Upon such an arrangement, the volume for accommodating the prism module can be substantially reduced, the deformation of the optical path can be reduced to a minimum, and thus the distortion of the image can be improved. Further, the processing speed for the system to perform the recognition can thereby be increased.

SUMMARY OF THE INVENTION

Accordingly, it is the primary object of the present invention to provide a thin optical imaging module of a biometric apparatus, which utilizes a glass substrate to provide a fingerprint imaging area for adhering an optical prism film, so as thereby to achieve the object of capturing the fingerprint image and the vein image simultaneously in a single action by a single image sensor.

It is another object of the present invention to provide a thin optical imaging module of a biometric apparatus that can integrate the optical prism film and the glass substrate into an optical imaging module, so as to minimize the whole volume for establishing the optical path and to increase the system's processing speed in recognition.

In the present invention, the thin optical imaging module of a biometric apparatus includes a first glass substrate, a first optical prism film, a second optical prism film, and an image sensor. The first glass substrate further includes a fingerprint imaging area, a vein imaging area, a contact surface, a reflective interface, and an attaching surface. The first optical prism film adhered to the attaching surface is located under the fingerprint imaging area. The second optical prism film is adhered to a position under the first optical prism film. The image sensor disposed in correspondence to the first glass substrate is located under the attaching surface.

All these objects are achieved by the thin optical imaging module of a biometric apparatus described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a thin optical imaging module of a biometric apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
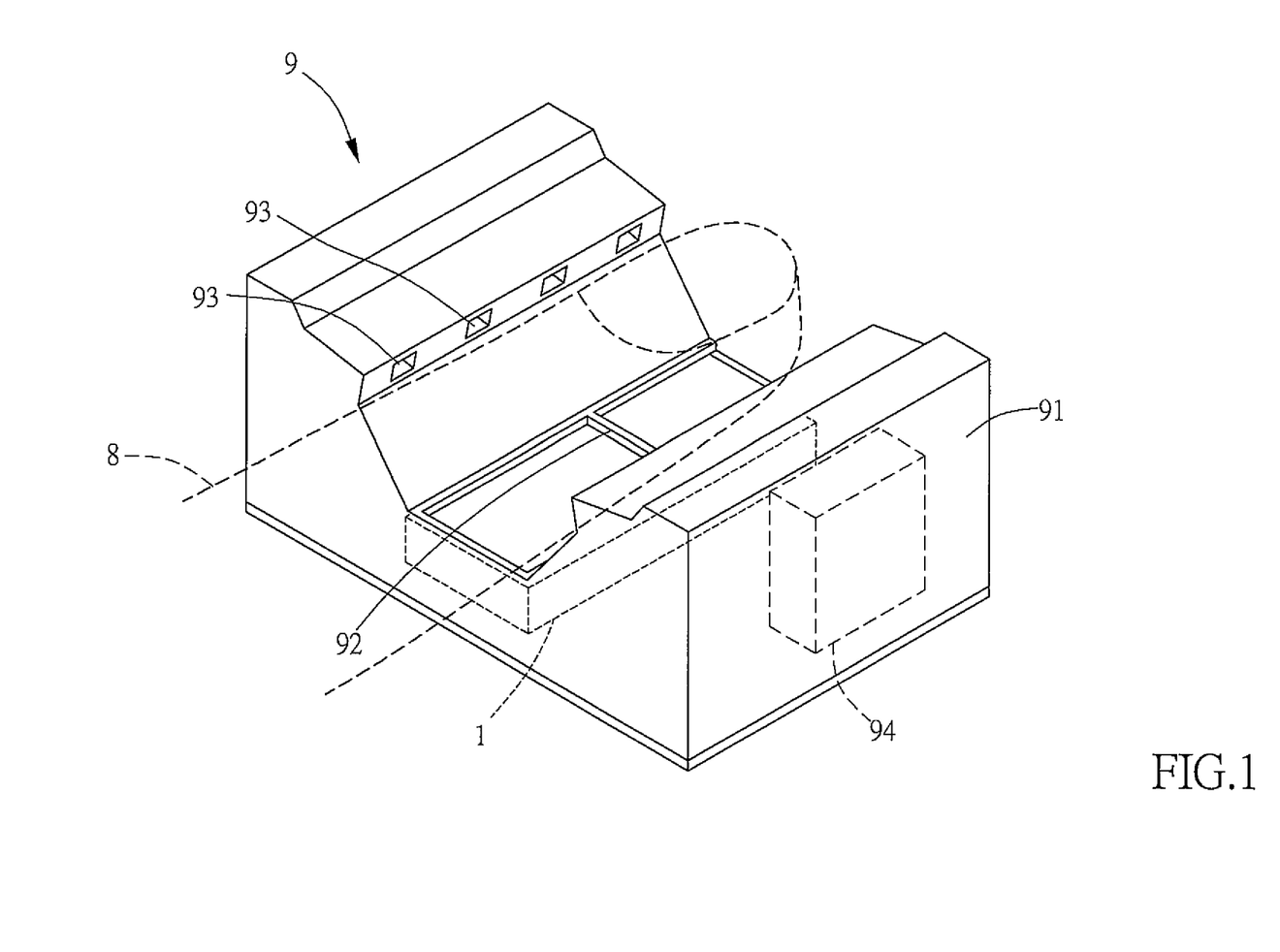
FIG. 1 is a schematic perspective view of a thin optical imaging module in accordance with the present invention mounted at a biometric apparatus.

Referring now to FIG. 1, a schematic perspective view of a thin optical imaging module in accordance with the present invention mounted at a biometric apparatus is shown. The thin optical imaging module 1 of the present invention is mounted in the a biometric apparatus 9 for recognizing at least one biological characteristic. In the present invention, the term "biological characteristic" is specified as the "fingerprint" or the "vein". The biometric apparatus 9 includes a carrier set 91, a positioning structure 92, at least one 1 light source unit 93 and a control module 94. In the present invention, the biological part to be tested is a finger 8, particularly the first knuckle or the second knuckle of the index finger. Preferably, the first knuckle is to be tested for fingerprint recognition, while the second knuckle is to be tested for vein recognition. The finger 8 is to be depressed on the positioning structure 92 of the carrier set 91 so as to allow the optical imaging module 1 of the biometric apparatus 9 to perform further recognition upon the fingerprint and the vein of the finger 8 via the control module 94 through the projection of the light source unit 93.

Figure 2:
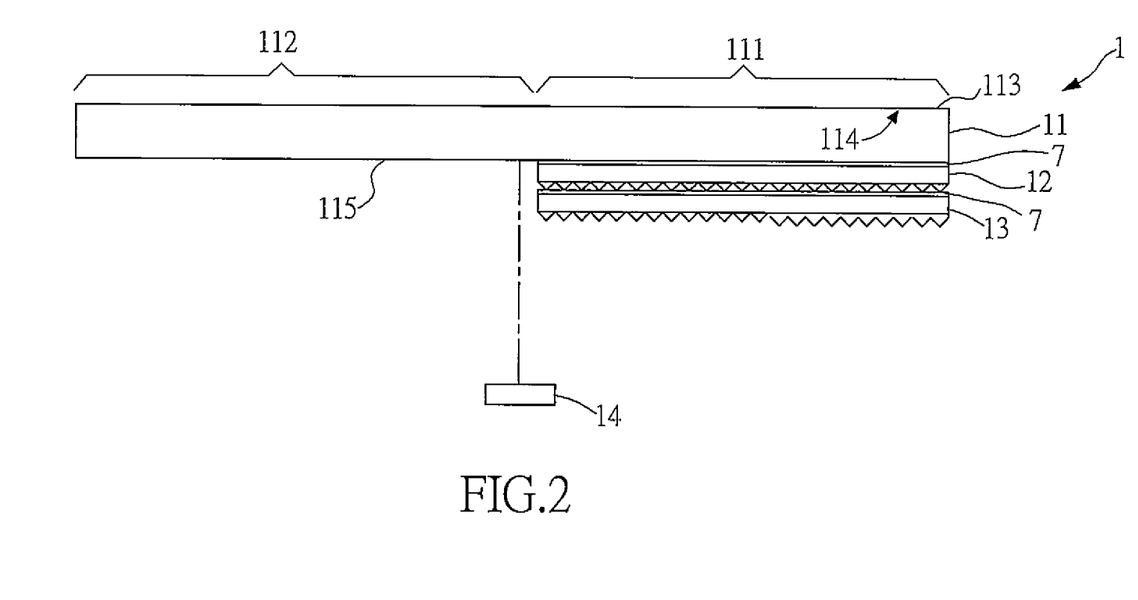
FIG. 2 is a schematic side view of a first embodiment of the thin optical imaging module of a biometric apparatus in accordance with the present invention.
Figure 3:
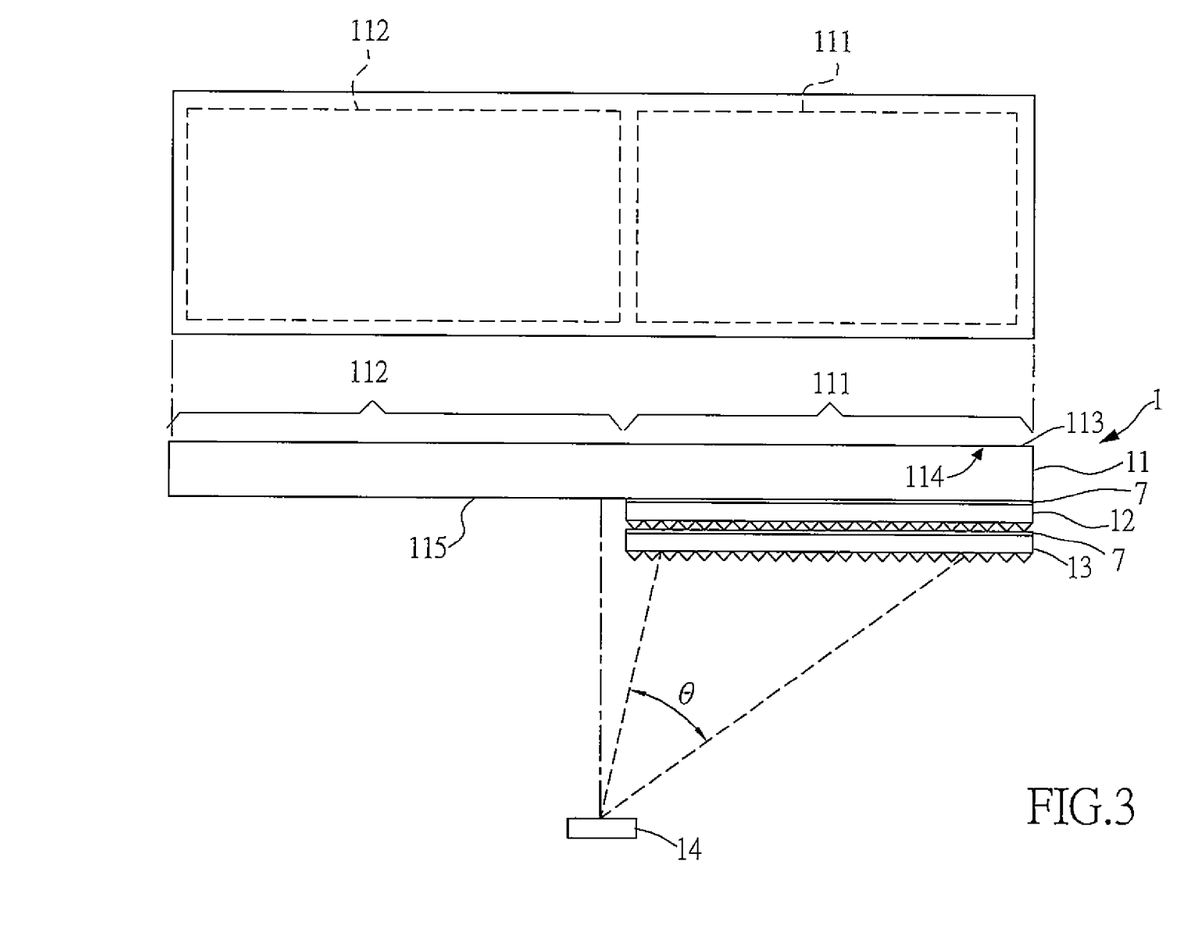
FIG. 3 demonstrates FIG. 2 again and a top view of FIG. 2.
Figure 4:
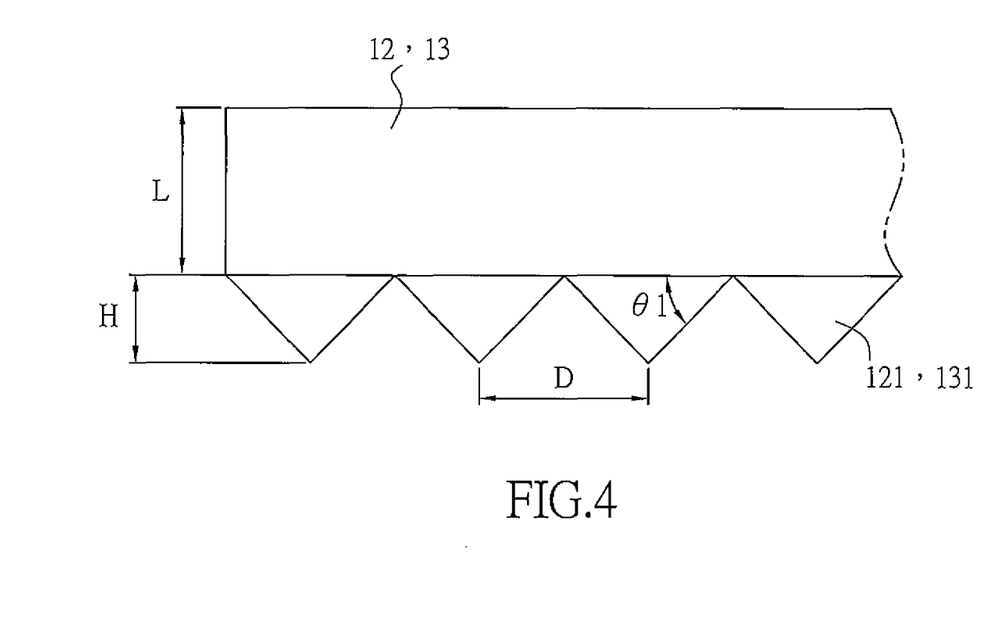
FIG. 4 is an enlarged view of a portion of the optical prism film of the first embodiment of FIG. 2.

Refer now to FIG. 2, FIG. 3 and FIG. 4, in which FIG. 2 is a schematic side view of a first embodiment of the thin optical imaging module of a biometric apparatus in accordance with the present invention, FIG. 3 demonstrates FIG. 2 again and a top view of FIG. 2, and FIG. 4 is an enlarged view of a portion of the optical prism film of the first embodiment of FIG. 2.

As shown in FIG. 2 and FIG. 3, the thin optical imaging module of a biometric apparatus 1 of the present invention includes a first glass substrate 11, a first optical prism film 12, a second optical prism film 13 and an image sensor 14. The first glass substrate 11 further includes a fingerprint imaging area 111, a vein imaging area 112, a contact surface 113, a reflective interface 114 and an attaching surface 115. The first optical prism film 12 adhered to the attaching surface 115 is located under the fingerprint imaging area 111. The second optical prism film 13 is adhered to a position under the first optical prism film 12. The image sensor 14 corresponding to the first glass substrate 11 is located under the attaching surface 115. The contact surface 113 is the portion of the first glass substrate 11 to directly contact the finger of the user (including the finger tip, the first knuckle and the second knuckle); i.e. the top surface of the first glass substrate 11. Based on the different areas of the contact surface 113 to touch the finger, the contact surface 113 is further divided into the fingerprint imaging area 111 and the vein imaging area 112. The reflective interface 114 is located at another side of the contact surface 113 by opposing to the fingerprint imaging area 111. The attaching surface 115 is on the surface opposing to the contact surface 113, i.e. the bottom surface of the first glass substrate 11.

The first glass substrate 11 can perform filtering of visible lights, isolating of the foreign dusts and particles, and capturing of the finger fingerprint, and can be one of an IR pass filter and a colored glass. Each of the first optical prism film 12 and the second optical prism film 13 is a prism sheet with prism microstructures. Through such type of the optical film, the incident lights can be deflected. For the image recognition purpose, either of the first optical prism film 12 and the second optical prism film 13 can be adhered to either the top surface or the bottom surface of the first glass substrate 11. However, by considering that the material for the first optical prism film 12 and the second optical prism film 13 is a softer material, the application of placing the softer material on top of the hard first glass substrate 11 would lead the finger to depress and, quite possible in a later time, damage the softer film. Thus, preferably in the present invention, both the first optical prism film 12 and the second optical prism film 13 are mounted under the first glass substrate 11, such that the harder first glass substrate 11 can provide protections for the films to some extent. Particularly, the first glass substrate 11, the first optical prism film 12, and the second optical prism film 13 are combined by applying an optical adhesive 7 in between, in which the optical adhesive 7 has a thickness about 25 µm.

As shown in FIG. 4, each of the first optical prism film 12 and the second optical prism film 13 includes individually a plurality of prism microstructures 121, 131 in an array formation. The pitch width D of the microstructures 121, 131 determines the degree of recognition of the fingerprint image. The larger the width D of the prism microstructures is, the clearer the ridges of the fingerprint are. Definitely, the optimum resolution shall be also up to the design of the image sensor 14. If the width D is much larger than the minimum resolution of the image sensor 14, then clear prism lining would appear on the captured image. Basically, the height H and the width D of the prism microstructure is kept as a proportional relationship about a ratio of 1:2 (H:D), and the height H and the θ1 would further affect the magnitude of the width D, in which the θ1 determines if the incident light can be easily deflected by the prism surface and obtain a total reflection on the reflective interface 114. Generally, a bigger θ1 would be easier to produce a total reflection with a limited range of reflective light. On the other hand, a smaller θ1 would be harder to produce a total reflection. Only within a specific range of the optical path, the second optical prism film 13 and the image sensor 14 can produce a complete fingerprint image with satisfied degree of recognition on the reflective interface 114. Though on some other places a total-reflective image may be produced, yet the obtained image is usually not complete. Further, the index of refraction of the first optical prism film 12 and the second optical prism film 13 also affects the location of the fingerprint image. A bigger index of the refraction would close the image to a center of the image sensor 14. In the present invention, the thickness L of the first optical prism film 12 or the second optical prism film 13 is ranged from 200 μm to 300 μm, and the pitch width D for the prism microstructure 121, 131 of the first optical prism film 12 and the second optical prism film 13 is ranged from 60 μm to 200 μm. The optimum value thereof shall be correlated to the minimum resolution of the image sensor 14. Also, each of the prism microstructures 121, 131 has a height H ranged from 30 μm to 100 μm, and is kept with the width D by a proportional relationship. Each of the prism microstructures 121, 131 has a horizontal angle θ1=45°.

Figure 5A:
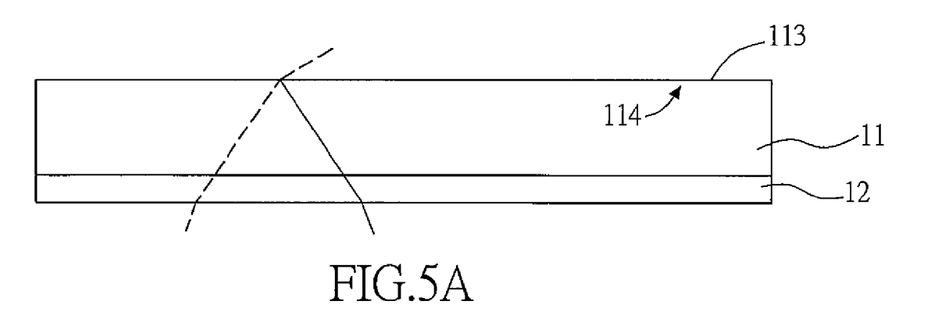
FIG. 5A demonstrates a typical optical path in the first glass substrate attached with the first optical prism film.
Figure 5B:
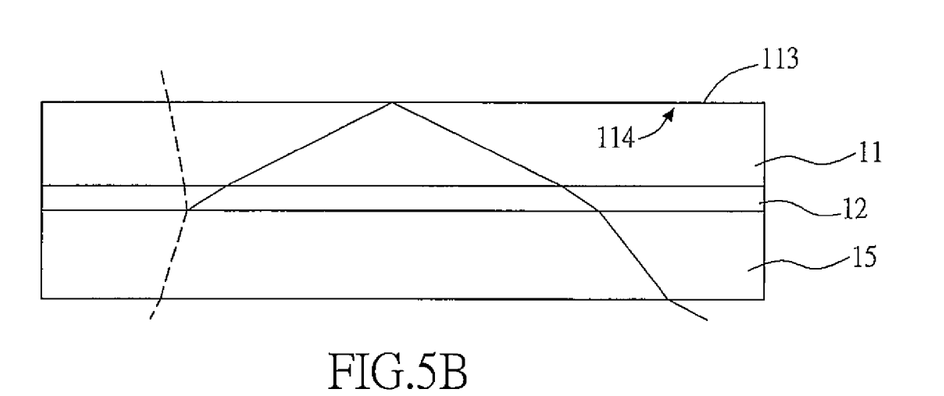
FIG. 5B demonstrates a typical optical path in the first glass substrate attached with the first optical prism film and a second glass substrate.
Figure 5C:
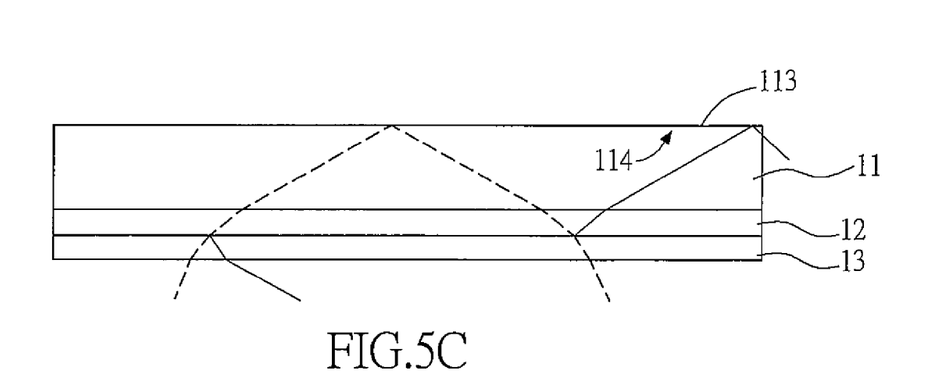
FIG. 5C demonstrates a typical optical path in the first embodiment of the thin optical imaging module of a biometric apparatus.

Refer now to FIG. 5A, FIG. 5B and FIG. 5C, in which FIG. 5A demonstrates a typical optical path in the first glass substrate attached with the first optical prism film, FIG. 5B demonstrates a typical optical path in the first glass substrate attached with the first optical prism film and a second glass substrate, and FIG. 5C demonstrates a typical optical path in the first embodiment of the thin optical imaging module of a biometric apparatus. In these simulation optical paths, the optical path of the image sensor 14 is used as a reference. Different line types stand for different levels of the photo energies. The main or major light ray (dashed line) stands for a strength of 1~0.66, the secondary light ray (solid line) stands for a strength of 0.66~0.33, and the even more secondary light ray (double solid line) stands for a strength of 0.33~0. importantly, the requirement is that the major light ray (dashed line) can generate a total reflection on the reflective interface 114 of the first glass substrate 11, so that a satisfied degree of recognition upon the fingerprint can be obtained.

As shown in FIG. 5A, in the case that only the first glass substrate 11 has the adhered first optical prism film 12, the optical path by simulation demonstrates that the major light ray (dashed line) can only generate partly reflection on the reflective interface 114. It means that, under the application of using a single layer of the first optical prism film 12 to the module cannot achieve an effective total reflection on the reflective interface 114. As shown in FIG. 5B, in the case of applying an additional second glass substrate 15 to the first glass substrate 11 having the first optical prism film 12, the major light ray (dashed line) would be deflected and then leave the reflective interface 114, and so no satisfaction in total reflection is obtained, either. As shown in FIG. 5C, in the case that two laminated layers of the optical prism films 12, 13 are adhered to the first glass substrate 11, the major light ray (dashed line) can then to undergo a satisfied total reflection.

Hence, in the first embodiment of the present invention, the first optical prism film 12 and the second optical prism film 13 are both introduced to act as the deflective media for the lights passing the fingerprint imaging area 111, the image sensor 14 is properly located (including a 16:9 image sensor), and then a 11°~26° total-reflective imaging area for the fingerprint can be obtained. Namely, in FIG. 3, the imaging range θ of the optical paths between the second optical prism film 13 and the image sensor 14 is 11°<θ<26°, such that the optical paths for the fingerprint imaging area 111 and the vein imaging area 112 can be preferably integrated so as able to capture images of the fingerprint and the vein in a single screen.

Namely, by applying two laminated layers of the first and the second optical prism films 12, 13 to be adhered to the fingerprint imaging area 111 under the attaching surface 115 of the first glass substrate 11, the fingerprint imaging area 111 and the vein imaging area 112 of the first glass substrate 11 can simultaneously capture and detect the fingerprint and the vein of a contacting finger 8. Also, with the image sensor 14 to be located right under the first glass substrate 11 to capture images of the fingerprint and the vein, the purpose of this present invention to capture the fingerprint and the vein images by a single action in a single screen can be achieved.

Figure 6:
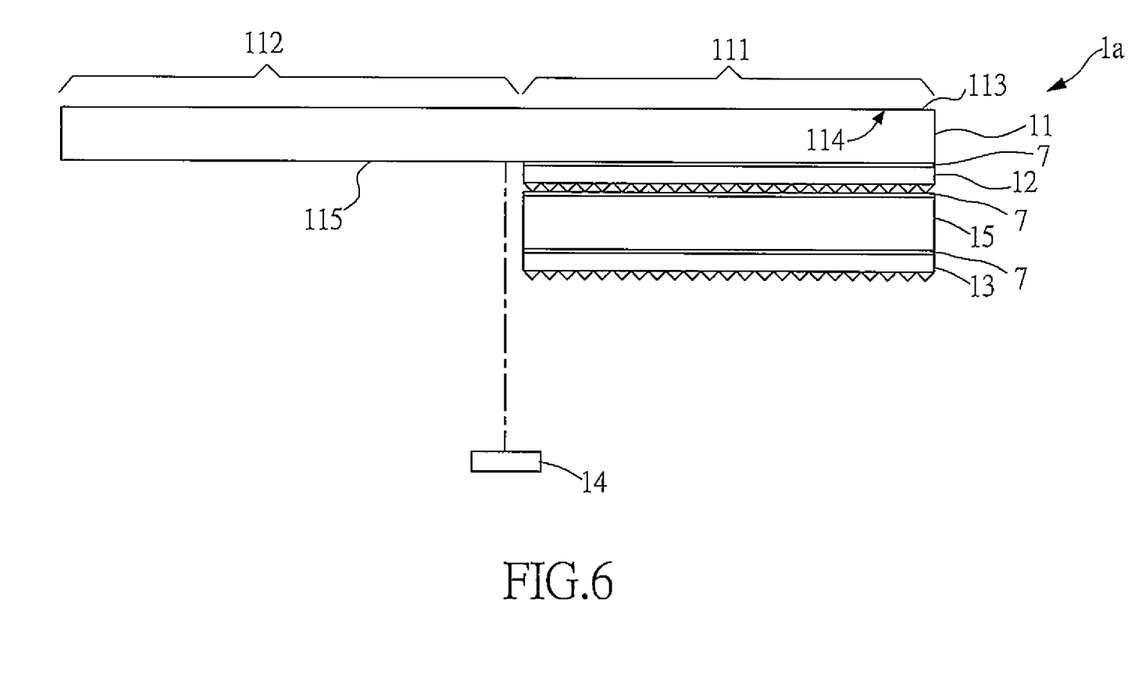
FIG. 6 is a schematic side view of a second embodiment of the thin optical imaging module of a biometric apparatus in accordance with the present invention.
Figure 7:
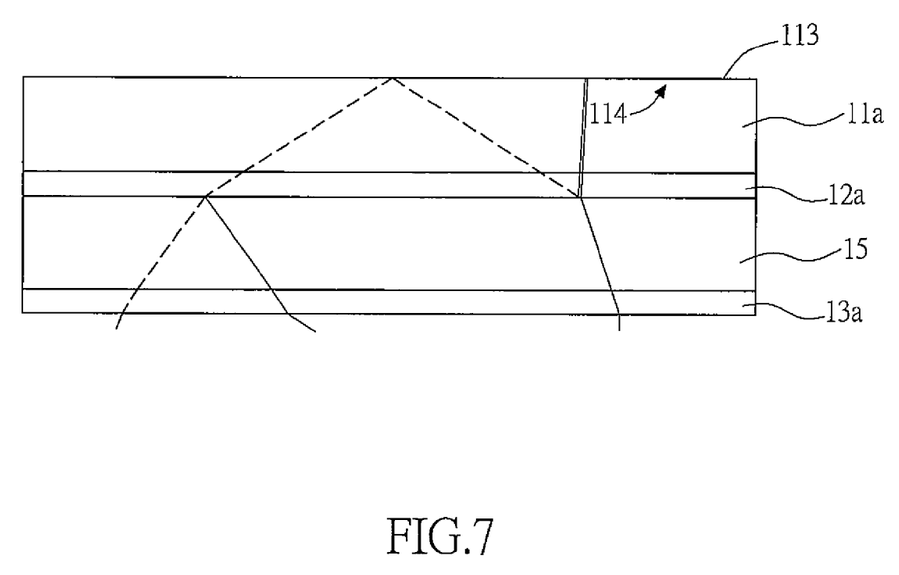
FIG. 7 demonstrates a typical optical path in the second embodiment of the thin optical imaging module of a biometric apparatus.

Refer now to FIG. 6 and FIG. 7, in which FIG. 6 is a schematic side view of a second embodiment of the thin optical imaging module of a biometric apparatus in accordance with the present invention, and FIG. 7 demonstrates a typical optical path in the second embodiment of the thin optical imaging module of a biometric apparatus. By compared to the first embodiment shown in FIG. 2 and FIG. 3, the major change in the second embodiment of the thin optical imaging module of a biometric apparatus shown herein is that a second glass substrate 15 is included by being sandwiched between the first optical prism film 12 of the optical imaging module 1a and the central portion of the second optical prism film 13. Namely, by applying the optical adhesive 7 to sandwich fixedly the second glass substrate 15 between the first optical prism film 12 and the second optical prism film 13 and then the whole combination is further adhered upward to the first glass substrate 11, the main light ray (dashed line in the figure) of the simulation optical path can achieve the object of total reflection.

Figure 8:
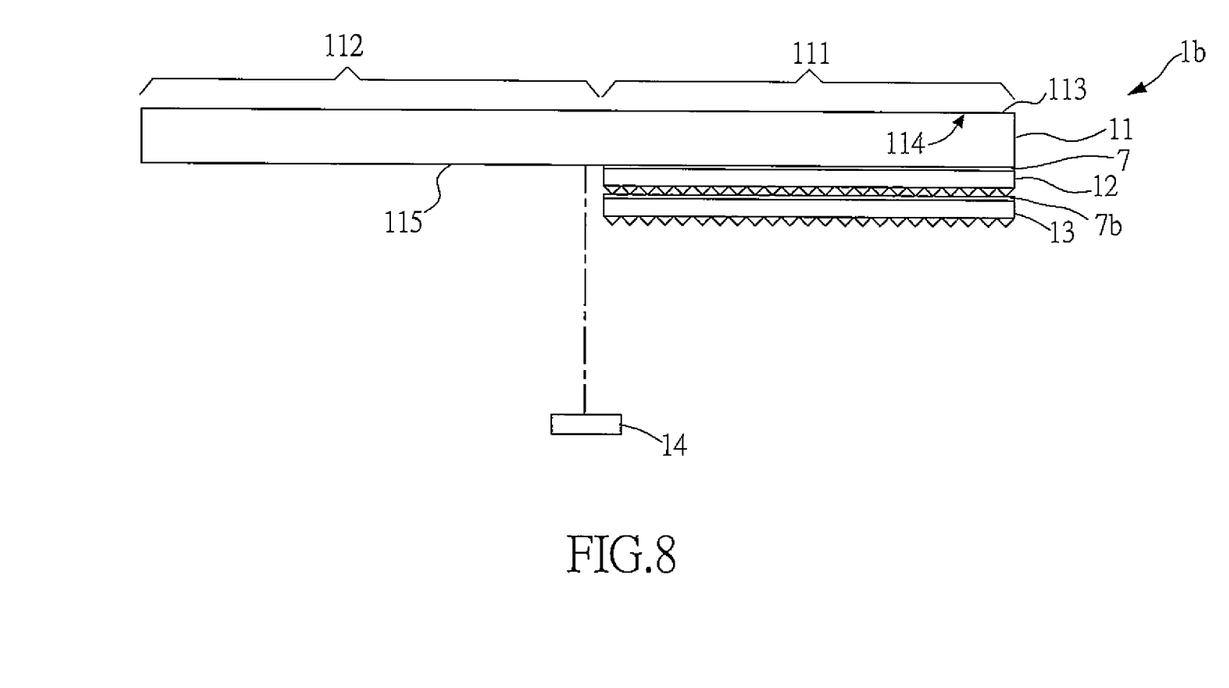
FIG. 8 is a schematic side view of a third embodiment of the thin optical imaging module of a biometric apparatus in accordance with the present invention.
Figure 9:
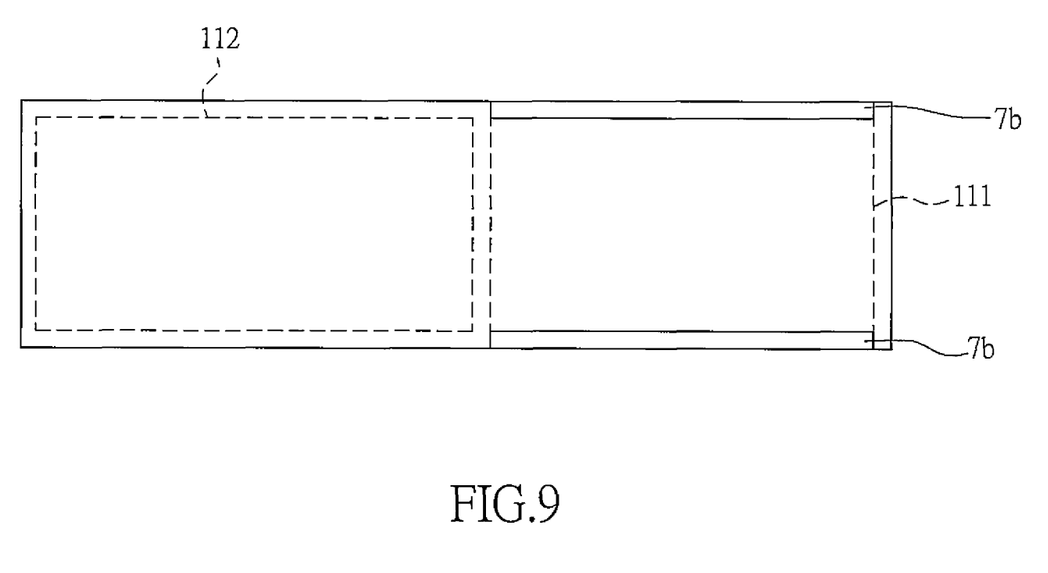
FIG. 9 demonstrates a schematic top view of FIG. 8 in the third embodiment of the thin optical imaging module of a biometric apparatus.

Refer now to FIG. 8 and FIG. 9, in which FIG. 8 is a schematic side view of a third embodiment of the thin optical imaging module of a biometric apparatus in accordance with the present invention, and FIG. 9 demonstrates a schematic top view t in the third embodiment of the thin optical imaging module of a biometric apparatus. By compared to the first embodiment shown in FIG. 2 and FIG. 3, the major change in the third embodiment 1b of the thin optical imaging module of a biometric apparatus shown herein is that, the second optical prism film 13 is partially adhered to and under the first optical prism film 12 by applying respective optical adhesives 7b only at two opposing lateral sides of the second optical prism film 13 for adhering to the two opposing lateral sides of the first optical prism film 12 respectively. That is, a middle portion of the second optical prism film 13 is not adhered to the first optical prism film 12, but only the two opposing lateral sides of the second optical prism film 13 is adhered to the corresponding two opposing lateral sides of the first optical prism film 12 by means of the respective optical adhesives 7b. Such that, there is an air gap between the middle portions of the first and second optical prism films 12, 13, so as to decrease the energy loss when light is passing through the interfaces of these optical prism film 12, 13 and optical adhesives 7b.

In summary, by providing the present invention, the thin optical imaging module of a biometric apparatus 1 includes a first glass substrate 11, a first optical prism film 12, a second optical prism film 13 and an image sensor 14. The first glass substrate 11 further includes a fingerprint imaging area 111, a vein imaging area 112, a contact surface 113, a reflective interface 114 and an attaching surface 115. The first optical prism film 12 adhered to the attaching surface 115 is located under the fingerprint imaging area 111. The second optical prism film 13 is adhered to a position under the first optical prism film 12. The image sensor 14 corresponding to the first glass substrate 11 is located under the attaching surface 115. Upon such an arrangement, the first glass substrate 11, the first optical prism film 12 and the second optical prism film 13 can be integrated into the optical imaging module 1 of the present invention, so that images of the fingerprint and the vein can be captured by the image sensor 14 with a single capturing action of the apparatus. Thus, the overall volume for the optical path can be further reduced, and system's processing speed of recognition can be increased.

While the present invention has been particularly shown and described with reference to a preferred embodiment, it will be understood by those skilled in the art that various changes in form and detail may be without departing from the spirit and scope of the present invention.

What is claimed is:

1. A thin optical imaging module of a biometric apparatus, comprising:
    a first glass substrate, further including a fingerprint imaging area, a vein imaging area, a contact surface, a reflective interface and an attaching surface;
    a first optical prism film, adhered to the attaching surface and located under the fingerprint imaging area;
    a second optical prism film, located under the first optical prism film; and
    an image sensor disposed under the attaching surface in correspondence with the first glass substrate;
    wherein an imaging range of an optical path θ of the second optical prism film and the image sensor is $11°<\theta<26°$.

2. The thin optical imaging module of a biometric apparatus of claim 1, further including a second glass substrate sandwiched between the first optical prism film and the second optical prism film.

3. The thin optical imaging module of a biometric apparatus of claim 2, wherein the first glass substrate, the second glass substrate, the first optical prism film and the second optical prism film are bound by an optical adhesive.

4. The thin optical imaging module of a biometric apparatus of claim 1, wherein a thickness L for each of the first optical prism film and the second optical prism film is ranged from 200 μm to 300 μm.

5. The thin optical imaging module of a biometric apparatus of claim 3, wherein a thickness of the optical adhesive is about 25 μm.

6. The thin optical imaging module of a biometric apparatus of claim 2, wherein each of the first glass substrate and the second glass substrate is one of an IR pass filter and a colored glass.

7. The thin optical imaging module of a biometric apparatus of claim 1, wherein each of the first optical prism film and the second optical prism film is consisted of a plurality of prism microstructures in an array formulation, each of the prism microstructures has a pitch width D ranged from 60 μm to 200 μm, each of the prism microstructures has a height H ranged from 30 μm to 100 μm, the height H is proportional to the width D by a ratio of H:D=1:2, and each of the prism microstructures has a horizontal angle $\theta 1=45°$.

8. A thin optical imaging module of a biometric apparatus, comprising:
    a first glass substrate, further including a fingerprint imaging area, a vein imaging area, a contact surface, a reflective interface and an attaching surface;
    a first optical prism film, adhered to the attaching surface and located under the fingerprint imaging area; and
    a second optical prism film, located under the first optical prism film;
    wherein each of the first optical prism film and the second optical prism film is consisted of a plurality of prism microstructures in an array formulation, each of the prism microstructures has a pitch width D ranged from 60 μm to 200 μm, each of the prism microstructures has a height H ranged from 30 μm to 100 μm, the height H is proportional to the width D by a ratio of H:D=1:2, and each of the prism microstructures has a horizontal angle $\theta 1=45°$.

* * * * *